(12) United States Patent
Yoon et al.

(10) Patent No.: US 9,360,609 B2
(45) Date of Patent: Jun. 7, 2016

(54) 2D/3D PROJECTOR WITH ROTATING TRANSLUCENT CYLINDER FOR ALTERNATING LIGHT POLARISATION

(75) Inventors: Youngshik Yoon, Valencia, CA (US); Charles Bryan Hunt, Westfield, IN (US); Mark Alan Schultz, Carmel, IN (US)

(73) Assignee: THOMSON LICENSING, Boulogne-Billancourt (FR)

( * ) Notice: Subject to any disclaimer, the term of this patent is extended or adjusted under 35 U.S.C. 154(b) by 379 days.

(21) Appl. No.: 12/448,002

(22) PCT Filed: Dec. 18, 2006

(86) PCT No.: PCT/US2006/048038
§ 371 (c)(1),
(2), (4) Date: Jun. 3, 2009

(87) PCT Pub. No.: WO2008/076103
PCT Pub. Date: Jun. 26, 2008

(65) Prior Publication Data
US 2010/0026959 A1 Feb. 4, 2010

(51) Int. Cl.
*G03B 21/00* (2006.01)
*G02B 5/30* (2006.01)
*G02B 27/26* (2006.01)
*G02B 27/28* (2006.01)
*G03B 21/14* (2006.01)
*G03B 35/26* (2006.01)
*H04N 9/31* (2006.01)
*H04N 13/04* (2006.01)

(52) U.S. Cl.
CPC .............. *G02B 5/3083* (2013.01); *G02B 27/26* (2013.01); *G02B 27/286* (2013.01); *G03B 21/14* (2013.01); *G03B 35/26* (2013.01); *H04N 9/3105* (2013.01); *H04N 9/3167* (2013.01); *H04N 13/0434* (2013.01); *H04N 13/0459* (2013.01)

(58) Field of Classification Search
CPC ........................ H04N 13/0434; H04N 13/0454
USPC ............ 353/8, 20, 84, 30, 31, 33, 81; 348/57; 352/171, 174; 359/486.02, 490.02
See application file for complete search history.

(56) References Cited

U.S. PATENT DOCUMENTS

| 3,704,061 A | 11/1972 | Travis |
| 5,517,340 A | 5/1996 | Doany et al. |
| 5,555,035 A | 9/1996 | Mead et al. |
| 5,903,304 A | 5/1999 | Deter |

(Continued)

FOREIGN PATENT DOCUMENTS

| CN | 1342022 A | 3/2002 |
| CN | 1424623 A | 6/2003 |

(Continued)

OTHER PUBLICATIONS

International Search Report Jun. 29, 2007.

*Primary Examiner* — Sultan Chowdhury
*Assistant Examiner* — Danell L Owens
(74) *Attorney, Agent, or Firm* — Richard LaPeruta; Patricia A. Verlangieri

(57) ABSTRACT

A 3D image projector having a translucent rotatable hollow cylinder, the hollow cylinder having differently polarized sections, and the projector being capable of passing a light beam generally orthogonally through a wall of the hollow cylinder is disclosed.

7 Claims, 2 Drawing Sheets

(56) References Cited

U.S. PATENT DOCUMENTS

| | | |
|---|---|---|
| 6,250,763 B1 | 6/2001 | Fielding et al. |
| 6,266,105 B1 | 7/2001 | Gleckman |
| 6,280,034 B1 | 8/2001 | Brennesholtz |
| 6,515,734 B1 | 2/2003 | Yamada et al. |
| 6,644,813 B1 | 11/2003 | Bowron |
| 6,648,475 B1 | 11/2003 | Roddy et al. |
| 6,799,851 B2 | 10/2004 | Yoon |
| 6,813,087 B2 | 11/2004 | Davis |
| 6,830,342 B2 | 12/2004 | Lee |
| 6,863,400 B1 | 3/2005 | Liang |
| 6,886,943 B1 | 5/2005 | Greenberg et al. |
| 7,018,045 B2 | 3/2006 | Tomita |
| 7,048,381 B2 | 5/2006 | Kim et al. |
| 7,125,123 B2 | 10/2006 | Kwon et al. |
| 7,210,788 B2 | 5/2007 | Lee et al. |
| 7,230,656 B2 | 6/2007 | Penn et al. |
| 7,386,125 B2 | 6/2008 | Bilobrov et al. |
| 7,515,746 B2 | 4/2009 | Pettitt |
| 7,794,092 B2 | 9/2010 | Drazic et al. |
| 7,862,182 B2 | 1/2011 | Thollot et al. |
| 2001/0024268 A1* | 9/2001 | Fielding et al. ............... 353/31 |
| 2002/0008770 A1 | 1/2002 | Ho et al. |
| 2002/0051094 A1 | 5/2002 | Makita |
| 2003/0151834 A1* | 8/2003 | Penn ............................ 359/833 |
| 2003/0197837 A1 | 10/2003 | Gyu Lee |
| 2004/0057022 A1 | 3/2004 | Song |
| 2004/0100589 A1 | 5/2004 | Ben-David et al. |
| 2004/0119947 A1 | 6/2004 | Kim et al. |
| 2004/0130682 A1 | 7/2004 | Tomita |
| 2004/0184005 A1 | 9/2004 | Roth |
| 2004/0233342 A1 | 11/2004 | Kim et al. |
| 2005/0057729 A1 | 3/2005 | Huang |
| 2005/0088629 A1 | 4/2005 | Greenberg et al. |
| 2005/0162615 A1 | 7/2005 | Penn |
| 2005/0168708 A1 | 8/2005 | Huang |
| 2005/0206846 A1 | 9/2005 | Yeung et al. |
| 2005/0237487 A1 | 10/2005 | Chang |
| 2006/0038964 A1 | 2/2006 | Lu et al. |
| 2006/0039068 A1* | 2/2006 | Tokita et al. ................. 359/483 |
| 2006/0044525 A1 | 3/2006 | Lee et al. |
| 2006/0119795 A1* | 6/2006 | Lippey et al. ................ 353/20 |
| 2006/0152524 A1 | 7/2006 | Miller et al. |
| 2006/0203209 A1 | 9/2006 | De Vaan |
| 2006/0220199 A1 | 10/2006 | Duboc et al. |
| 2006/0290777 A1 | 12/2006 | Iwamoto et al. |
| 2007/0014114 A1* | 1/2007 | Barazza ........................ 362/297 |
| 2007/0097024 A1* | 5/2007 | Jung et al. .................... 345/32 |
| 2007/0139624 A1* | 6/2007 | DeCusatis et al. ............ 353/84 |
| 2007/0195275 A1 | 8/2007 | Drazic et al. |
| 2007/0273835 A1* | 11/2007 | Fan et al. ...................... 353/7 |
| 2008/0151354 A1 | 6/2008 | Mehrl |
| 2009/0108182 A1 | 4/2009 | Thiebaud et al. |
| 2009/0140974 A1 | 6/2009 | Maeda |
| 2010/0014008 A1 | 1/2010 | Yoon |
| 2010/0026959 A1 | 2/2010 | Yoon et al. |
| 2010/0104260 A1 | 4/2010 | Yoon et al. |
| 2010/0315596 A1 | 12/2010 | Yoon |
| 2011/0013143 A1 | 1/2011 | Yoon |

FOREIGN PATENT DOCUMENTS

| | | |
|---|---|---|
| CN | 1721916 A | 1/2006 |
| DE | 19626097 | 10/1997 |
| EP | 10268230 | 10/1998 |
| EP | 1220549 A2 | 7/2002 |
| EP | 1317148 A1 | 6/2003 |
| FR | 2872924 | 1/2006 |
| JP | 8289218 | 1/1996 |
| JP | 10268230 | 10/1998 |
| JP | 10-304284 A | 11/1998 |
| JP | 11-505334 A | 5/1999 |
| JP | 2001306023 | 11/2001 |
| JP | 2002-287247 A2 | 10/2002 |
| JP | 2004144907 | 5/2004 |
| JP | 2004-205919 A2 | 7/2004 |
| JP | 2004286964 | 10/2004 |
| JP | 2005241904 | 9/2005 |
| JP | 2006-58588 A | 3/2006 |
| JP | 2006-276311 A2 | 10/2006 |
| JP | 2007-017536 A2 | 1/2007 |
| JP | 2007127856 | 5/2007 |
| JP | 2007-519372 A | 7/2007 |
| JP | 2008506142 A | 2/2008 |
| KR | 2006-0019381 A | 3/2006 |
| WO | WO/98/00746 | 1/1998 |
| WO | WO0191471 | 11/2001 |
| WO | WO2004040899 | 5/2004 |
| WO | WO2005025215 A2 | 3/2005 |
| WO | 2005/074258 A1 | 8/2005 |
| WO | WO2006057001 | 6/2006 |
| WO | WO2006118881 | 11/2006 |

* cited by examiner

2D/3D PROJECTOR WITH ROTATING TRANSLUCENT CYLINDER FOR ALTERNATING LIGHT POLARISATION

CROSS REFERENCE TO RELATED APPLICATIONS

This application is related to U.S. patent application Ser. No. 12/312,998 filed Dec. 18, 2006, which was published as U.S. 2010/0315596 on Dec. 16, 2010; U.S. patent application Ser. No. 12/448,320 filed Dec. 19, 2006, which was published as U.S. 2010/0014008 on Jan. 21, 2010; and U.S. patent application Ser. No. 12/450,683 filed Apr. 25, 2007, which was published as U.S. 2011/0013143 on Jan. 20, 2011.

This application is a National Stage Application and claims the benefit, under 35 U.S.C. §365 of International Application PCT/US2006/048038 filed Dec. 18, 2006 which was published in accordance with PCT Article 21(2) on Jun. 26, 2008 in English.

FIELD OF THE INVENTION

The invention relates generally to the generation of 3D images. More specifically, the invention relates to the conversion of 2D images into 3D images and projecting the 3D images.

BACKGROUND OF THE INVENTION

It is well known that a projected image may be enhanced with an appearance of depth by converting the projected image into a so-called 3D image. This is generally accomplished by optically polarizing the images which are to be viewed by a viewer's left eye differently than the images which are to be viewed by a viewer's right eye. The 3D effect is perceived by the viewer when the viewer views the polarized images through the use of polarized filter lenses, commonly configured as '3D viewing glasses' with a polarized filter for use with the left eye of the viewer and a differently polarized filter for use with the right eye of the viewer. When the 3D viewing glasses are used to view the 3D images, the left eye of the viewer sees only the light polarized appropriately for passage through the polarized filter associated with the left eye and the right eye of the viewer sees only the light polarized appropriately for passage through the polarized filter associated with the right eye of the viewer. The above described method of displaying 3D images is known as passive 3D viewing where the projector alternates the left eye information with the right eye information at double the typical frame rate and a screen/filter/polarizing blocker in front of the projector's lenses alternates the polarization of the projected image in such a way that the image of each eye passes through the corresponding polarizing filter of the pair of passive stereo glasses discussed above.

An alternative to passive 3D viewing is active 3D viewing where each viewer wears glasses with LCD light shutters which work in synchronization with the projector so that when the projector displays the left eye image, the right eye shutter of the active stereo eyewear is closed, and vice versa. One problem with current systems for providing 3D images is that the projectionist must attach and configure an external special device to the standard projector, a costly and time consuming requirement which also leads to technical failure. Further, when the projectionist again desires to project only a 2D image, the special device must be manually removed or turned off. In addition, having such a device attached to the projector parallel to the projection lens surface introduces a risk that light will reflect back to the imagers from which the light originates, often causing lower picture quality in color productions and undesirable contrast ratio change in black & white productions.

Another problem with current 2D/3D projectors is that the color gamut achieved by typical single projector systems is not as extensive as intended by the director of the film. Referring now to FIG. 1 (Prior Art), a typical three color prism 100 is shown. Prism 100 is typically used with a three-chip digital micromirror device projector. As shown, a light beam 102 enters prism 100, and in reaction to known optical coating methods, is selectively reflected or transmitted depending on the wavelength of the light. Further, known total internal reflection techniques, such as providing a small air gap between prism 100 components, may be used to control the reflection of the divided components of light beam 100. After having been separated into three color components, each light beam 102 color component is directed to and selectively reflected out of prism 100 by a digital micromirror device. Particularly, digital micromirror device 104 reflects a blue color component of light beam 102, digital micromirror device 106 reflects a green color component of light beam 102, and digital micromirror device 108 reflects a red color component of light beam 102. Each digital micromirror device 104, 106, 108 may be individually controlled in a known manner to produced a combined color image which is projected from prism 100.

While there are many advanced methods of displaying 3D images, room for improvement remains.

SUMMARY OF THE INVENTION

The present invention is directed to a 3D image projector having a translucent rotatable hollow cylinder, the hollow cylinder having more than one differently polarized sections, and the projector being capable of passing a light beam generally orthogonally through a wall of the hollow cylinder.

DETAILED DESCRIPTION OF THE INVENTION

Figure 1:
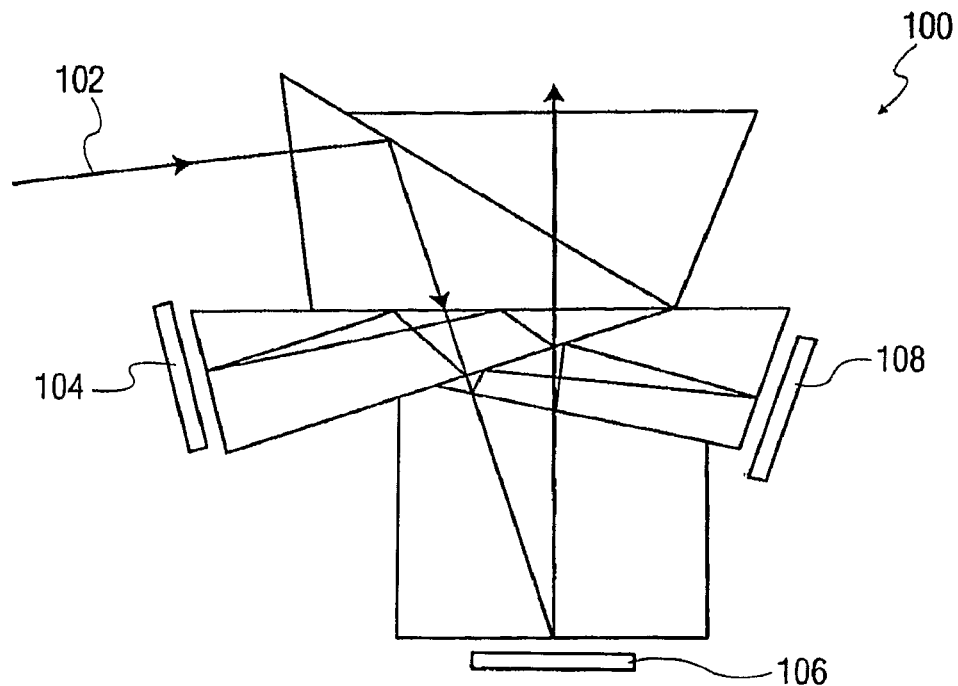
FIG. 1 is an orthogonal schematic illustration of a prism used for separating a light beam into three color components according to prior art.
Figure 2:
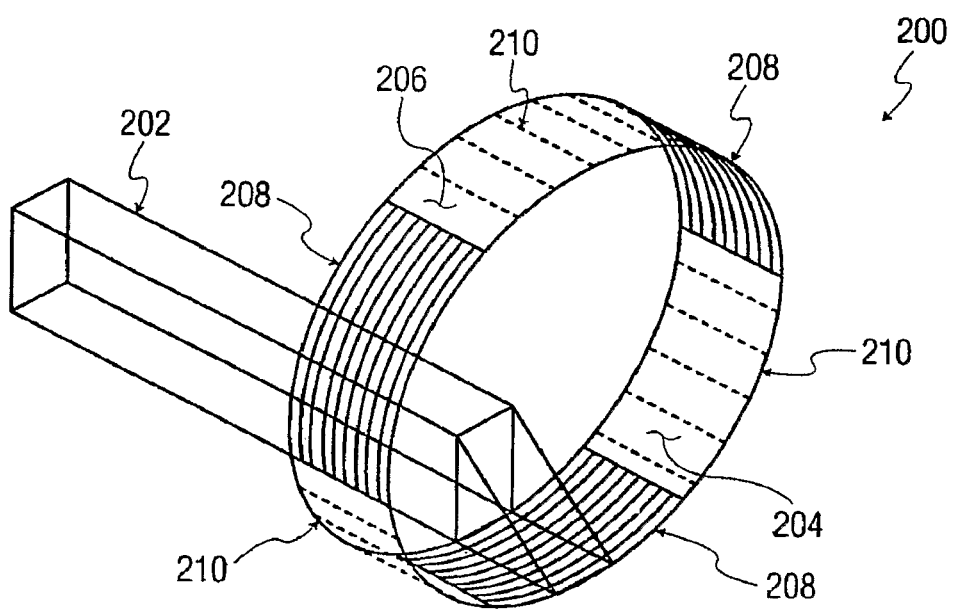
FIG. 2 is an oblique schematic illustration of a polarization drum according to the present invention.

Referring now to FIG. 2 in the drawings, a polarizing drum (or hollow cylinder) according to a first embodiment of the present invention is illustrated. Polarizing drum 200 is a rotatable drum-like structure (or hollow cylinder) formed of translucent materials. Drum 200 is shown as a generally cylindrical band of material located in close proximity or next to a directional light transmission device (or light pipe) 202 for passing light through drum 200 by directing light generally orthogonal to an interior surface 204 of the drum 200 such that light passes through the translucent material and exits the drum 200 through an exterior surface 206 of the drum 200 (through a wall of the drum). As shown, the drum is divided into radially alternating P-polarization sections 208 (or clockwise circular polarization sections) and S-polarization sections 210 (or counter-clockwise circular polarization sections). In operation, a 2D image may be converted to a 3D image by transmitting the 2D image through the directional light transmission device 202 and subsequently through the polarization drum 200 while drum 200 is rotated about its central axis. The drum 200 is rotated at a controlled speed so as to appropriately polarize each frame of images as either P-polarization or S-polarization by passing the image through sections 208, 210, respectively.

Figure 3:
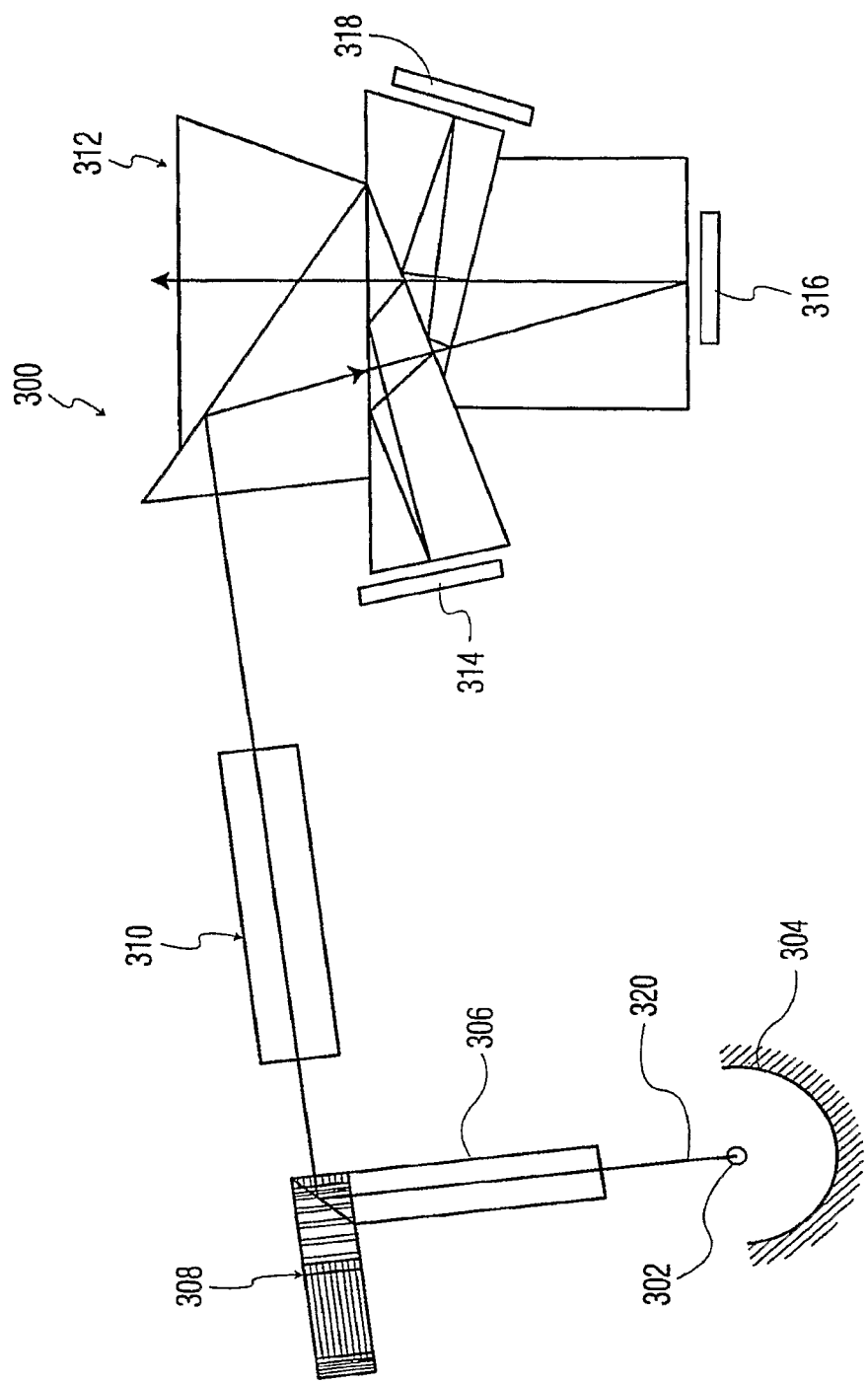
FIG. 3 is an orthogonal schematic illustration of a 3D projector according to the present invention.

Referring now to FIG. 3 in the drawings, a 3D projector according to the present invention is illustrated. Projector 300 comprises a light source 302 having a reflector 304, a directional light transmission device 306 similar to device 202, a polarizing drum 308 similar to drum 200, relay optics 310, a prism 312 similar to prism 100, and digital micromirror devices 314, 316, 318, similar to digital micromirror devices 104, 106, 108, respectively. In operation, light source 302 emits a light beam 320 into directional light transmission device 306 which then directs the light through polarizing drum 308 as polarizing drum 308 rotates about its central axis. The light beam 320 then travels through relay optics 310 which direct the light beam 320 into prism 312. Prism 312 divides the light beam 320 into separate color components and directs the color components of the light beam 320 onto digital micromirror devices 314, 316, 318, which are associated with the colors blue, green, and red, respectively. As described above, the color components of light beam 320 are then subsequently directed out of prism 312 by digital micromirror devices 314, 316, 318. The 3D image is perceived by a viewer of the projected image when the viewer wears polarized filter glasses (not shown) which allow only one of the P and S polarized portions of light through the glasses to each eye of the viewer. The projector should present approximately twice the number of frames per second in 3D mode as opposed to a normal 2D mode since each eye will only see every other frame. Alternatively, the projector can be used as a 2D projector by projecting image data containing only frames to be viewed by both eyes of the viewer simultaneously, by the viewer not wearing polarized filter glasses, and by optionally not rotating the polarization drum 306. The rotation and/or attachment of the polarizing drum to the projector 300 may optionally be controlled by a software instruction and no further mechanical interaction by a user of the projector 300.

An aspect of the invention also includes the method of converting 2D images into 3D images, wherein a 2D image projected through the translucent polarized hollow cylinder (i.e. drum) as the hollow cylinder is rotated such that the projected 2D images are projected generally orthogonally through a wall of the hollow cylinder. The method includes the 2D images being projected alternatingly through P-polarized and S-polarized sections of the hollow cylinder. Alternatively, the projected 2D images can be projected alternatingly through clockwise circular polarized and counter-clockwise circular polarized sections of the hollow cylinder. After projecting the 2D images through the hollow cylinder, the images are projected into a prism configured to split a light beam into three primary color components and direct each of the primary color components to separate digital micromirror devices. Further, the step of selectively preventing rotation of the hollow cylinder in response to a software instruction can be included. In the method, the rotatable hollow cylinder comprises a translucent wall having differently polarized sections.

It is to be understood that although six separate polarization portions are shown in FIG. 2, a smaller or greater number of different separate polarization portions can be utilized. Further, although the polarization sections are generally designed to not be color filters, embodiments where the polarization sections are also color filters is considered be an aspect of the invention.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A 3D projector comprising:
   a rotatable hollow cylinder having more than one differently polarizing sections;
   three digital micromirror devices; and
   a prism configured to split a light beam into three primary color components and to direct each of the primary color components separately to the three digital micromirror devices;
   wherein a light beam is capable of being passed generally orthogonally through a wall of the hollow cylinder and wherein the 3D projector projects images that are perceived as 3D images; and
   wherein the 3D projector has two modes, a 2D mode and a 3D mode, and the projector presents twice the number of frames per second in the 3D mode compared to the 2D mode.

2. The 3D projector according to claim 1, wherein the light beam is passed through the wall of the hollow cylinder as the hollow cylinder is rotated about a central axis of the hollow cylinder.

3. The 3D projector according to claim 1, wherein the differently polarizing sections are polarized as either P-polarizing or S-polarizing.

4. The 3D projector according to claim 3, wherein each P-polarized section is generally circumferentially bounded by S-polarizing sections and each S-polarizing section is generally circumferentially bounded by P-polarizing sections.

5. The 3D projector according to claim 1, wherein the differently polarizing sections are polarized as either clockwise circular polarizing or counter-clockwise circular polarizing.

6. The 3D projector according to claim 5, wherein each clockwise circular polarizing section is generally circumferentially bounded by counter-clockwise circular polarizing sections and each counter-clockwise circular polarizing section is generally circumferentially bounded by clockwise circular polarizing sections.

7. The 3D projector according to claim 1, wherein the polarizing sections are translucent and not color filters.

\* \* \* \* \*